June 17, 1969  TAKAICHI MABUCHI  3,450,916
BRUSH SUPPORTING MEANS FOR MINIATURE ELECTRIC MOTORS
Filed Dec. 23, 1965
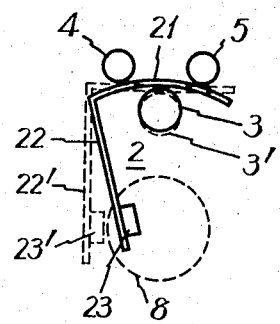
Fig. 1
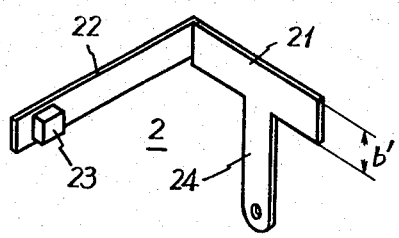
Fig. 2
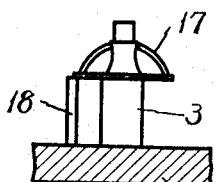
Fig. 3
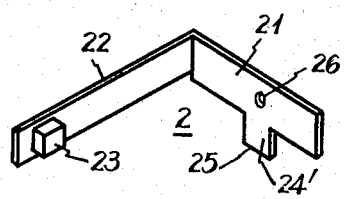
Fig. 4-A
Fig. 4-B
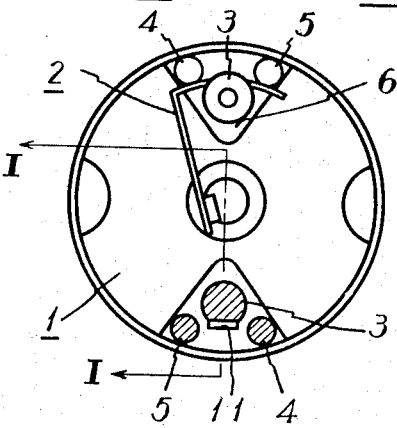
Fig. 5-A
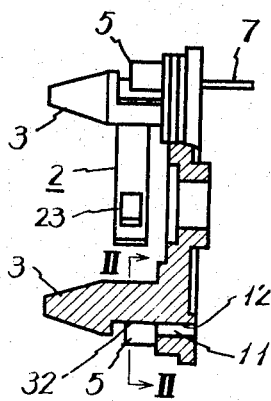
Fig. 5-B
INVENTOR
Takaichi Mabuchi
BY
ATTYS.

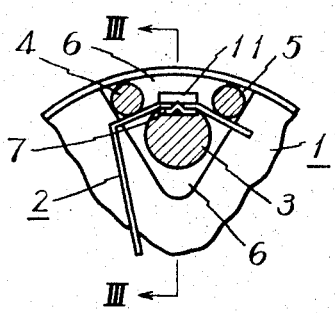
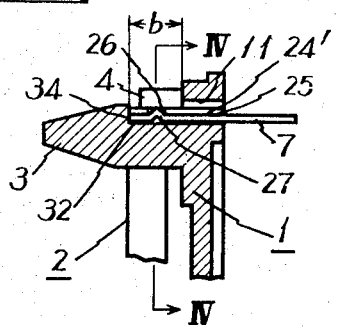
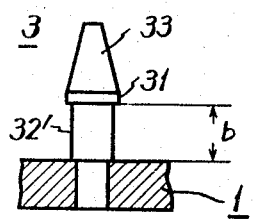
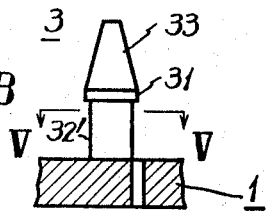
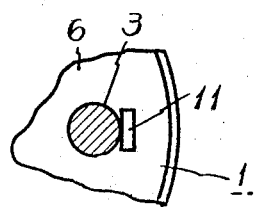

United States Patent Office 3,450,916
Patented June 17, 1969

3,450,916
BRUSH SUPPORTING MEANS FOR MINIATURE ELECTRIC MOTORS
Takaichi Mabuchi, 262, Hondencho, Katsushika-ku, Tokyo, Japan
Filed Dec. 23, 1965, Ser. No. 516,039
Claims priority, application Japan, Aug. 18, 1965, 50,227
Int. Cl. H01r 39/38
U.S. Cl. 310—244                    1 Claim

ABSTRACT OF THE DISCLOSURE

Brush supporting means for a miniature electric motor having an elongated brush holder having attached to its one end a brush, brush holder supporting means including a pair of rods and a central rod for supporting the other end portion of said brush holder therebetween, said other end portion of said brush holder having formed thereon a recess, said brush holder supporting means having bored therein an opening at the position flush with one side surface of said central rod, and a terminal plate having a projection, said terminal plate being inserted through said opening between said other end portion and said central rod to adjust the contact pressure of said brush and to positively be connected with said brush-holder.

---

The present invention relates to brush supporting means for a miniature electric motor, more particularly to brush supporting means in which the contact pressure of the brush on the commutator can freely be adjusted from the outside of a casing of the motor.

It is one object of the present invention to provide brush supporting means for a miniature electric motor in which the contact pressure of the brush on the commutator can readily be adjusted after the motor has been assembled.

It is another object of the present invention to provide brush supporting means for a miniature electric motor in which the lead plate of the brush can easily be replaced without the necessity of removing the cover plate of a casing of the motor after the motor has been assembled.

It is still another object of the present invention to provide brush supporting means for a miniature electric motor in which a brush holder can easily be attached to the cover plate of the motor casing.

Other objects, features and advantages of the present invention will become apparent from the following description taken in conjunction with the accompanying drawings, in which:

FIGURE 1 is a schematic diagram illustrating an arrangement of brush supporting means;

FIGURE 2 is a perspective view illustrating an example of a brush holder of the brush supporting means illustrated in FIGURE 1;

FIGURE 3 is a side view illustrating an example of conventional means for supporting the brush holder;

FIGURE 4A is a perspective view illustrating an example of the brush holder according to this invention;

FIGURE 4B is a perspective view illustrating an example of a terminal plate which cooperates with the brush holder illustrated in FIGURE 4A;

FIGURE 5A is a front view illustrating an embodiment of the brush supporting means produced according to this invention, having one portion shown in cross section viewed along the line II—II in FIGURE 5B;

FIGURE 5B is a side view of the brush supporting means illustrated in FIGURE 5A, having one portion shown in cross section viewed along the line I—I in FIGURE 5A;

FIGURE 6A is a front view of the principal part of the brush supporting means of this invention, having one portion shown in cross section viewed along the line IV—IV in FIGURE 6B;

FIGURE 6B is a side view of the principal part illustrated in FIGURE 6A, having one portion shown in cross section viewed along the line III—III in FIGURE 6A;

FIGURE 7A is a side view of a brush holder supporting member in another embodiment of this invention;

FIGURE 7B is a side view of the brush holder supporting member viewed at right angle to the direction in FIGURE 7A; and FIGURE 7C is a front view of the brush holder supporting member but illustrating in cross section viewed along the line V—V in FIGURE 7B.

In this type of miniature electric motors there have heretofore been employed brush supporting means such that the base portion 21 of a brush holder 2 made of a resilient plate, which has been previously shaped into a suitable form, is held by three support rods 3, 4 and 5 projecting from an insulation cover plate of a casing of the motor, as schematically illustrated in FIGURE 1. In such suporting means, as shown in FIGURE 3, a set nut 17 commonly referred to as a speed nut is fitted to the top of the central support rod 3 and the set nut 17 in turn is held by a rod 18 formed integrally with the insulation cover plate 1, thereby preventing the base portion of the brush holder 2 slipping off from the support rod 3.

Furthermore, in the supporting means described above the contact pressure of the brush on the commutator (hereinafter referred to as a brush pressure) is produced as the reaction based upon the recovery force of distortion applied to the resilient brush holder when the brush is pressed against the commutator. That is, the contact pressure depends upon the quality of the material, thickness, shape of the brush holder, relative arrangements of the support rods for the brush holder and so on. Therefore, it has been regarded as difficult to manufacture a motor having various brush pressures by using a cover plate and a brush holder made under a certain design or to change the brush pressure after assembling of the motor. According to the present invention, the above difficulties can be easily removed.

In addition, the brush holder 2 of such supporting means is in the form of T such that a lead plate portion 24 is divided from one side of the base portion 21 and the lead plate portion 24 is made to project out through an opening (not illustrated) bored in the cover plate, serving as a connecting terminal for an external power source. However, the projecting portion of the brush holder 2 may readily be broken or damaged during transportation or in actual use and whenever the damage brush member is replaced with a new one the cover plate must be removed.

According to the invention, however, replacement of such a damaged brush holder can easily be accomplished without accompanying such a disadvantage as encountered in the past.

With reference to the drawings, the present invention will hereinafter be described in detail.

In FIGURE 5 the reference numeral 1 designates an insulation cover plate, 2 a brush holder. The reference numerals 3, 4 and 5 identify support rods which are preferred to be formed integral with the insulation cover plate 1 by molding a suitable plastics material. As illustrated in the figure, the support rods are positioned on a flat base member 6 slightly projecting from the inner face of the cover plate 1 in a manner such that the rods 4 and 5 are positioned on both sides of the central rods 3, constituting a triad. The insulation cover plate 1 is provided with two upper and lower triads of the support rods. In the figure the top end portions of the lower triad of the support rods have been cut off along the line II—II in FIGURE 5B and since the brush holder supported thereby is exactly the same as the aforementioned one, the brush holder has been left out for the sake of brevity. The brush holder 2 is made of a resilient conductive thin metal plate, which is bent approximately 90° at its central portion in the form of L and is provided with a lead plate portion 24' extending from one side of the base portion 21, as illustrated in FIGURE 4A. Further, there is secured to the top end of a flexible portion 22 a brush 23 which contacts a commutator (not illustrated). When the brush holder 2 is not subjected to any force, the base portion 21 is straight. When the base portion 21 is slid between the side support rods 4, 5 and the central support rod 3, the recovery force by the resiliency of the base portion 21 strongly acts on the contact surfaces of the base portion 21 with the support rods and the base portion 21 is firmly supported by the support rods. On the side of the central support rod 3 which contacts the base portion 21 of the brush holder 2, there is formed a recess 32 the bottom plane of which is in parallel to the axis of the rod 3, thus defining a stepped portion 34 with the bottom plane and end wall of the recess 32. At the base of the recess 32 of the central support rod 3, a slot 11 is formed in the cover plate 1 and one of the inner walls 12 of the slot 11 is flush with the bottom of the recess 32, as illustrated in FIGURE 5B. When the base portion 21 of the brush holder 2 has been fitted to the recess 32 the lead plate 24 has also been inserted into the slot 11 and the free end 25 of the lead plate 24 is substantially flush with the opening end of the slot 11. Then, a metal terminal plate such as illustrated in FIGURE 4B is inserted through the recess 32 between the central support rod 3 and the base portion 21 of the brush holder 2. In this case, it is possible to provide a recess 26 in the base portion 21 and a projection 27 in the terminal plate positioning means 7 at a place corresponding to the recess 26, in a manner so that the projection 27 is pressed into snug engagement with the recess 26 when the terminal plate 7 has been inserted to a predetermined position. At the predetermined position the terminal plate 7 is electrically connected to the base portion 21 of the brush holder 2 and the outer end of the terminal plate 7 projects out of the slot 11 and the projecting end serves as a terminal for connecting the brush holder 2 with an external circuit.

In order to support the brush holder in the right position in such brush supporting means, the base portion 21 of the brush holder 2 is inserted between the support rods 3, 4 and 5 while the free end 25 of the lead plate 24 is inserted into the slot 11 until the lower marginal edge 24' of the base portion 21 comes into contact with the base member 6 on the cover plate 1. Then, the spacer or terminal plate 7 is inserted between the central support rod 3 and the base portion 21 of the brush holder 2 through the slot 11.

Referring now to FIGURE 1, the brush supporting means constructed as explained above will hereinbelow be described in detail. The pressure of the brush 23 exerted on the surface of a commutator 8 illustrated in the dotted line depends upon an arrangement of the central support rod 3 relative to the other support rods 4 and 5. If now the axial position of the central support rod 3 may be moved up and down and the rod 3 lies at the dotted-line position 3' slightly lower than the full-line position as illustrated in FIGURE 1, the base portion 21 of the brush holder 2 is held straight as shown in the dotted line, the flexible portion 22 assumes the dotted-line position 22' and consequently the brush 23 is in light contact with the peripheral surface of the commutator 8 at such a position as identified at 23'. Supposing that the commutator 8 is not provided in this case, the base portion 21 is bent as shown in the full line and the flexible portion 22 is also caused to move in the counter-clockwise direction as shown in the full line as the support rod 3 moves upwards from the position 3'. Where the commutator 8 is actually provided, the flexible portion 22 is pressed against the peripheral surface of the commutator 8 and the brush pressure thereon gradually increases by the recovery force of the distorted base portion 21 of the brush holder 2. Since the distance between the contact surfaces of the base portion with the support rods 3 and 4 is extremely shorter than the distance between the contact surface of the base portion 21 with the support rod 4 and the brush 23 (the arm length of the brush holder 2), the brush pressure greatly increases with a slight upward displacement of the central support rod 3. In the brush supporting means (refer to FIGURE 6), insertion of the terminal plate 7 between the recess 32 of the central support rod 3 and the base portion 21 produces the same result as that produced by the upward displacement of the central support rod 3 with respect to the rods 4 and 5. Accordingly, the brush pressure can greatly be changed by a slight change in the width of the terminal plate 7. Since the terminal plate 7 can be replaced from the outside, the brush pressure can easily be changed in finished motors. In a miniature motor adjustment of the brush pressure is often required because of variations in the speed and load of the motor and wear of the brush. Such an adjustment can readily be accomplished by application of the present invention, as is apparent from the foregoing. Further, it is possible to produce motors having various speeds and rated outputs by using parts of the same design.

The aforementioned terminal plate 7 serves for connecting the brush holder 2 with an external power source as well as for the adjustment of the brush pressure. In addition, since the terminal plate can freely be detached from the motor and its mechanical strength can be increased by using a material different from the brush holder, breakage of the terminal plate can greatly be avoided during transportation and packing of the motor.

The foregoing has described an example in which the spacer plate 7 for the brush pressure adjustment is used for the terminal of the brush. However, in the case where a brush holder such as illustrated in FIGURE 2 is employed and its divided plate 24 is used as the lead plate, a different spacer of a suitable thickness is inserted between the support rod 3 and the base portion 21 of the brush holder 2 solely for the brush pressure adjustment. In this case, it is possible to insert the spacer plate 7 between the support rod 4 and the base portion 21 of the brush holder 2 through a slot provided at the base of the support rod 4, instead of inserting the spacer plate 7 between the central support rod 3 and the base portion 21.

FIGURE 7 illustrates another example of the brush holder support, in which the support rod 3 is provided with a diametrically reduced portion as identified at 32'. Also in this case, the bottom of the portion 32' is contiguous to the slot 11 and flush with one of its inner walls 12. In all cases, it is preferred that the height $b$ of the recess 32 or the diametrically reduced portion 32' is selected substantially equal to or a little greater than the width $b'$ of the base portion of the brush holder. In the present example only the central support rod 3 has formed thereon a recess or a diametrically reduced portion to form a stepped portion such as indicated at 34, thereby preventing slipping off of the brush holder. Further, it is possible that the support rods 4 and 5 are provided with a recessed or diametrically reduced portion on the contact surfaces thereof with the base portion, by means of which the brush holder is held. The stepped portion 34 and the diametrically reduced portion 32 form a flange thereby to define the position of the brush holder and to prevent undesirable movement of the brush holder in a plane including the base portion thereof.

It will be apparent that many modifications and variations may be effected without departing from the scope of the novel concepts of this invention.

What I claim is:

1. Brush suporting means for a miniature electric motor comprising an elongated brush holder made of resilient material and bent substantially in the shape of an L to form a base portion and a flexible portion, a brush fixed to one free end of said flexible portion, an end cover plate of the motor, brush holder supporting means including a pair of suport rods and a central support rod connected to said end cover plate, said supporting means holding said base portion of said brush holder at three different places, said central support rod formed with a recess on one side thereof, said end cover plate formed with an opening aligned with said recess of said central rod, a recess formed in said base portion, a terminal plate positioning means having a projection at right angles to the base portion and extending transverse to the axis of the central support rod, whereby after said base portion of said elongated brush holder has been inserted between said pair of support rods and said central support rod, said terminal plate positioning means may be inserted between said base portion and said central support rod to adjust the contact pressure of said brush and to form good electrical contact between said terminal plate positioning means and said base portion by engaging said projection of said terminal plate positioning means in said recess of said base portion, said support rods are cylindrical and a portion of the outer periphery is formed to be flush with one of the inner walls of said opening of the end cover plate to permit the insertion of said terminal plate positioning means through said opening and to define the position of said inserted terminal plate positioning means, and a flange portion formed at the upper portion of said central support rod to prevent undesirable movement of said brush holder.

References Cited

UNITED STATES PATENTS

| | | | |
|---|---|---|---|
| 3,254,249 | 5/1966 | Pfeifer | 310—244 |
| 3,296,473 | 1/1967 | Mabuchi | 310—239 |

WARREN E. RAY, *Primary Examiner.*